United States Patent
Ohashi et al.

(10) Patent No.: US 9,068,111 B2
(45) Date of Patent: Jun. 30, 2015

(54) SCINTILLATOR HAVING A PHASE SEPARATION STRUCTURE AND RADIATION DETECTOR USING THE SAME

(75) Inventors: Yoshihiro Ohashi, Tokyo (JP); Nobuhiro Yasui, Yokohama (JP); Toru Den, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/123,575

(22) PCT Filed: Jul. 27, 2012

(86) PCT No.: PCT/JP2012/069780
§ 371 (c)(1),
(2), (4) Date: Dec. 3, 2013

(87) PCT Pub. No.: WO2013/015454
PCT Pub. Date: Jan. 31, 2013

(65) Prior Publication Data
US 2014/0110587 A1    Apr. 24, 2014

(30) Foreign Application Priority Data

Jul. 27, 2011  (JP) .................. 2011-164320

(51) Int. Cl.
*G01T 1/20*  (2006.01)
*C09K 11/02*  (2006.01)
(Continued)

(52) U.S. Cl.
CPC ............ *C09K 11/025* (2013.01); *C09K 11/7774* (2013.01); *G21K 4/00* (2013.01);
(Continued)

(58) Field of Classification Search
CPC ........................................ G01T 1/20
USPC ..................................... 250/361 R
See application file for complete search history.

(56) References Cited

U.S. PATENT DOCUMENTS

| 4,528,210 A | 7/1985 | Noji et al. |
| 5,242,620 A * | 9/1993 | Dole et al. ............. 252/301.4 R |

(Continued)

FOREIGN PATENT DOCUMENTS

| CN | 1834201 A | 9/2006 |
| CN | 1995274 A | 7/2007 |

(Continued)

OTHER PUBLICATIONS

Office Action in Chinese Application No. 201280036274.5 (dated Jul. 29, 2014).

(Continued)

*Primary Examiner* — David Porta
*Assistant Examiner* — Hugh M Maupin
(74) *Attorney, Agent, or Firm* — Fitzpatrick, Cella, Harper & Scinto (57) ABSTRACT

Provided is a scintillator used for radiation detection in an X-ray CT scanner or the like, the scintillator having a unidirectional phase separation structure having an optical waveguide function, which eliminates the need of formation of banks for preventing crosstalk. The scintillator has a waveguide function instead of the banks or the like. The scintillator includes: a first crystal phase including multiple columnar crystals having unidirectionality; and a second crystal phase for covering a side of the first crystal phase. The first crystal phase includes a perovskite type oxide material including at least one element selected from the group consisting of Lu and Gd, and a rare earth element as an emission center. The first crystal phase emits light by radiation excitation.

20 Claims, 6 Drawing Sheets

(51) Int. Cl.
    *C09K 11/77* (2006.01)
    *G21K 4/00* (2006.01)
    *G01T 1/202* (2006.01)
    *C04B 35/111* (2006.01)
    *C04B 35/115* (2006.01)
    *C04B 35/117* (2006.01)
    *C04B 35/44* (2006.01)
    *C04B 35/50* (2006.01)

(52) U.S. Cl.
CPC ........... *G21K 2004/06* (2013.01); *G01T 1/202* (2013.01); *C04B 35/111* (2013.01); *C04B 35/115* (2013.01); *C04B 35/117* (2013.01); *C04B 35/44* (2013.01); *C04B 35/50* (2013.01); *C04B 2235/3222* (2013.01); *C04B 2235/3224* (2013.01); *C04B 2235/3229* (2013.01); *C04B 2235/764* (2013.01); *C04B 2235/78* (2013.01); *C04B 2235/787* (2013.01); *C04B 2235/80* (2013.01)

(56) References Cited

U.S. PATENT DOCUMENTS

| | | | |
|---|---|---|---|
| 6,649,824 B1 | 11/2003 | Den et al. | |
| 6,803,704 B2 | 10/2004 | Motoi et al. | |
| 6,860,982 B2 | 3/2005 | Okura et al. | |
| 7,087,831 B2 | 8/2006 | Den | |
| 7,202,477 B2 | 4/2007 | Srivastava et al. | |
| 7,560,046 B2 | 7/2009 | Lyons et al. | |
| 8,435,899 B2 | 5/2013 | Miyata et al. | |
| 8,586,931 B2 | 11/2013 | Horie et al. | |
| 8,618,489 B2 | 12/2013 | Ohashi et al. | |
| 8,669,527 B2 | 3/2014 | Ueyama et al. | |
| 2004/0200964 A1 | 10/2004 | Lefaucheur et al. | |
| 2005/0081912 A1 | 4/2005 | Okura et al. | |
| 2006/0128155 A1 | 6/2006 | Miyata et al. | |
| 2006/0202125 A1* | 9/2006 | Suhami | 250/368 |
| 2007/0075254 A1 | 4/2007 | Shoji et al. | |
| 2009/0008561 A1* | 1/2009 | Nagarkar et al. | 250/361 R |
| 2010/0059668 A1 | 3/2010 | Lyons et al. | |
| 2011/0223323 A1 | 9/2011 | Ohashi et al. | |
| 2013/0026374 A1 | 1/2013 | Saito et al. | |
| 2013/0341512 A1 | 12/2013 | Ohashi et al. | |
| 2014/0084167 A1 | 3/2014 | Ohashi et al. | |

FOREIGN PATENT DOCUMENTS

| | | |
|---|---|---|
| EP | 0 042 149 A1 | 12/1981 |
| EP | 1466955 A2 | 10/2004 |
| EP | 1 518 914 A2 | 3/2005 |
| JP | 2008-145335 A | 6/2008 |
| WO | 2013/015438 A2 | 1/2013 |

OTHER PUBLICATIONS

Second Office Action in Chinese Application No. 201280036274.5 (dated Mar. 17, 2015).

* cited by examiner

SCINTILLATOR HAVING A PHASE SEPARATION STRUCTURE AND RADIATION DETECTOR USING THE SAME

TECHNICAL FIELD

The present invention relates to a scintillator as a material which emits light when being excited by radiation and a scintillator having a function of waveguiding the emitted light to a photodetector. The present invention also relates to a radiation detector using the scintillator.

BACKGROUND ART

In an X-ray computed tomography (CT) scanner used in clinical practice or the like, X-rays which pass through an object are received by a scintillator, and light emitted from the scintillator is detected by photodetectors. The detectors are arranged as a two-dimensional array, and the scintillator is partitioned by banks so that crosstalk between light beams are not caused. Further, it is desired that the banks be formed as thin as possible so that the banks do not contribute to the X-ray detection and degrade the spatial resolution of the X-ray CT scanner.

For example, Patent Literature 1 discloses a method of joining a large number of scintillator crystals to one another with an adhesive to form a scintillator array, and then, etching out the adhesive and filling a gap formed by the etching with titanium oxide powder as a bank material. It is disclosed that, in this case, the thickness of banks may be reduced as small as about 1 μm.

CITATION LIST

Patent Literature

PTL 1: Japanese Patent Application Laid-Open No. 2008-145335

SUMMARY OF INVENTION

Technical Problem

However, in the technology according to Patent Literature 1, no matter how thin the banks may be formed, the existence of the banks themselves cannot be eliminated. Further, with regard to manufacture of the banks, many processes are required such as cutting of the scintillator and joining of the scintillators for forming the banks.

Accordingly, it is an object of the present invention to impart an optical waveguide function to a scintillator itself, in order to radically solve the problem that banks to be scattering planes or reflection planes are necessary because the optical waveguide function is not conventionally imparted to the scintillator itself.

According to a first aspect of the present invention, there is provided a scintillator including: a first crystal phase including multiple columnar crystals having unidirectionality; and a second crystal phase for covering a side of the first crystal phase, in which the first crystal phase includes a perovskite type oxide material including at least one element selected from the group consisting of Lu and Gd, and a rare earth element as an emission center, and in which the first crystal phase emits light by radiation excitation.

Other aspects of the present invention will be clarified in the embodiments described below.

Advantageous Effects of Invention

According to the present invention, a scintillator can be obtained which has a phase separation structure including two phases of a first crystal phase including multiple columnar crystals having unidirectionality and a second crystal phase covering a side of the first crystal phase and which itself has an optical waveguide function. As a result, processes such as a cutting process and a bank formation process which are necessary in manufacturing the conventional scintillator can be made unnecessary. Further, a radiation detector having a simple structure can be obtained which may be used only by disposing a scintillator so as to face photodetectors arranged in an array.

Further features of the present invention will become apparent from the following description of exemplary embodiments with reference to the attached drawings.

DESCRIPTION OF EMBODIMENTS

An embodiment for carrying out the present invention is described in the following with reference to the attached drawings. Note that, there are various embodiments for carrying out the present invention (various structures and various materials), but a point common to the following embodiments is that, in a scintillator having a phase separation structure including a first crystal phase including multiple columnar crystals having unidirectionality and a second crystal phase covering a side of the first crystal phase, the first crystal phase includes a perovskite type oxide material and has a refractive index which is higher than that of the second crystal phase. In such a structure, among light generated in the first crystal phase as a higher refractive index phase, light which enters at an angle that satisfies the total reflection condition at an interface with the second crystal phase having a lower refractive index is totally reflected. As a result, light is waveguided and propagates through the first crystal phase having a higher refractive index. In this case, the first crystal phase as the higher refractive index phase includes the multiple columnar crystals having unidirectionality, and thus, waveguiding of the light (light guiding) is achieved in one direction. In other words, it can be said that light generated in the scintillator travels toward the one direction in a state in which the light is confined in the first crystal phase (that is, while diffusion of the light being suppressed). According to the present invention, the light is confined in particular in the first crystal phase including the multiple columnar crystals having unidirectionality, and thus, unless there is a structural defect or a large extent of bending of a column, light which is totally reflected once does not leak from the first crystal phase. In other words, generated light is waveguided toward the one direction with a very high spatial resolution. In this way, in all embodiments of the present invention, the scintillator itself has an optical waveguide function (light guiding function). In order to further improve the optical waveguide function of the scintillator according to the present invention, it is preferred that the first crystal phase include 90 to 100 wt % of a perovskite type oxide material with respect to the total weight of the first crystal phase, and it is more preferred that the first crystal phase is formed of a perovskite type oxide material.

Embodiments for practicing the present invention are described in further detail in the following.

(Structure of Scintillator)

Figure 1:
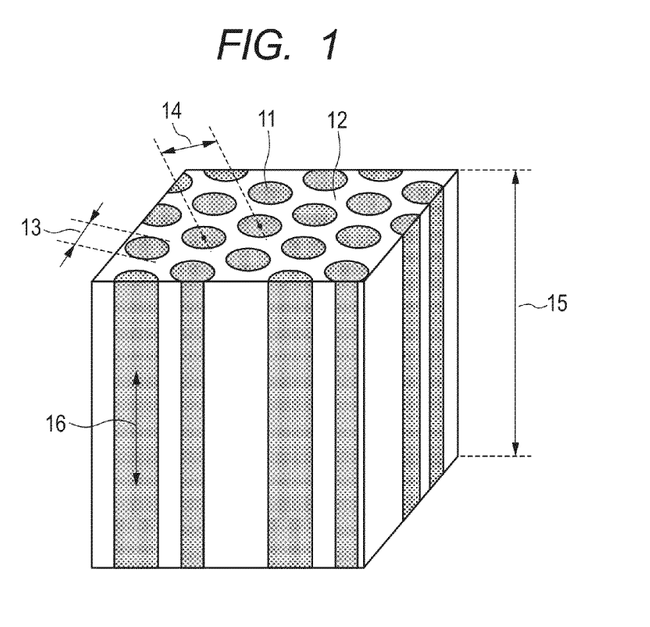
FIG. 1 is a schematic perspective view of a scintillator according to the present invention.

FIG. 1 is a schematic perspective view of a scintillator according to the present embodiment.

The scintillator according to the present embodiment has a phase separation structure including two phases of a first crystal phase 11 including multiple columnar crystals having unidirectionality and a second crystal phase 12 covering a side of the first crystal phase 11. The shape of the columnar crystals constituting the first crystal phase 11 is not limited to a cylinder illustrated in FIG. 1 and may be various shapes including a polygonal prism. Further, it is preferred that the diameter 13 of the columnar crystals constituting the first crystal phase 11 is within the range of 300 nm or more and 30 µm or less.

Specifically, generated light reaches a photodetector while being reflected at an interface between the first crystal phase 11 and the second crystal phase 12. At this time, when a period of the structure is shorter than the wavelength of the light, much component of the light passes through the interface without being reflected. Therefore, it is desirable that the diameter of the columnar crystals of the first crystal phase 11 is longer than the wavelength of the generated light. In the present embodiment, in particular, a scintillator which emits light in the ultra-violet region of 300 nm or more is also used, and thus, it is desirable that the diameter of the columnar crystals of the first crystal phase 11 be 300 nm or more. Further, when the diameter 13 of the columnar crystals of the first crystal phase is longer than a pixel of the photodetector, the effect of confining light within a pixel is reduced, and thus, it is desirable that the upper limit of the diameter 13 of the columnar crystals of the first crystal phase is smaller than the size of a pixel. In the present embodiment, in particular, a photodetector having a pixel size of 30 µm square is used, and thus, it is desirable that the diameter 13 of the columnar crystals of the first crystal phase is 30 µm or less. On the other hand, the distance 14 between closest columnar crystals of the first crystal phase is determined depending on the diameter 13 of the columnar crystals of the first crystal phase. As the distance 14 between the closest columnar crystals of the first crystal phase becomes larger, the area occupied by the first crystal phase becomes smaller, and thus, it is desirable that the diameter of the columnar crystals of the first crystal phase is approximately 60% of the distance 14 between the closest columnar crystals so that the columnar crystals of the first crystal phase are packed closest together. For example, when the diameter 13 of the columnar crystals of the first crystal phase is the upper limit of 30 µm, it is desirable that the distance 14 between the closest columnar crystals of the first crystal phase be 50 µm. Further, when the diameter 13 of the columnar crystals of the first crystal phase is the lower limit of 300 nm, it is desirable that the distance 14 between the closest columnar crystals of the first crystal phase be 500 nm. In summary, it is preferred that the diameter of the columnar crystals of the first crystal phase 11 is within the range of 300 nm or more and 30 µm or less, and the distance 14 between the closest columnar crystals on average is within the range of 500 nm or more and 50 µm or less. The distance between the closest columnar crystals of the first crystal phase as used herein means the length of a straight line connecting center lines of adjacent columnar crystals of the first crystal phase at the shortest distance. However, when the scintillator according to the present embodiment and a detector or a detector array are used in combination, it is preferred that a scintillator having such a structure and a size that a plurality of columnar crystals thereof are arranged on a light receiving region of such a photodetector so as to face the photodetector is used in combination. Therefore, it is preferred to combine a scintillator having a structure and a size smaller than the size of the light receiving region in accordance with the size of the light receiving region. For example, when the light receiving region is in the shape of 20 µm square, a scintillator having such a structure and a size that the diameter of the columnar crystals of the first crystal phase is 5 µm and the distance between the closest columnar crystals of the first crystal phase on average is 8 µm is used in combination. Further, the size and the structure of the scintillator are determined by the selection of a material constituting the scintillator and the manufacture conditions, which are described below.

Further, although partly depending on the manufacturing method, the thickness 15 of the scintillator may be adjusted to be an arbitrary thickness. Substantially, it is preferred that the first crystal phase is straightly continuous along the thickness direction (extension direction) 16 of the columnar crystal of the first crystal phase. However, the present invention does not exclude cases where a columnar crystal of the first crystal phase is discontinuous midway, a columnar crystal branches, multiple columnar crystals become one, the diameter of a columnar crystal changes, a columnar crystal is not linear and a nonlinear portion is included, and the like. Through appropriate control of the direction of a solidification interface described below, it is also possible to intentionally bend a columnar crystal of the first crystal phase.

In the present invention, it is preferred that the first crystal phase is formed of a perovskite type oxide material represented by a general formula $ABO_3$, the second crystal phase is formed of alumina ($Al_2O_3$) or any one of a garnet type oxide material represented by a general formula $A_3B_5O_{12}$, and 0.001 mol % or more of a rare earth element (rare earth ion) including at least one of $Ce^{3+}$, $Tb^{3+}$, $Pr^{3+}$, and $Eu^{3+}$ with respect to the total amount of substance of the first crystal phase and the second crystal phase as an emission center. In this case, in the general formulae, it is preferred that A is at least one element selected from the group consisting of Lu and Gd, and B is at least one element selected from the group consisting of Al, Sc, and Y.

It is preferred that the first crystal phase be selected from the group consisting of $GdScO_3$, $LuScO_3$, $GdAlO_3$, and $LuAlO_3$, which are perovskite type oxide materials. Further, it is preferred that the second crystal phase is $Gd_3Sc_2Al_3O_{12}$, $Lu_3Sc_2Al_3O_{12}$, or $Al_2O_3$. Further, in order to allow the crystals to function as a scintillator, it is preferred that 0.001 mol % or more of a rare earth element (rare earth ion) including at least one of $Ce^{3+}$, $Tb^{3+}$, $Pr^{3+}$, and $Eu^{3+}$ with respect to the total amount of substance of the first crystal phase and the second crystal phase is contained as the emission center. When $Ce^{3+}$ is added, a high-speed emission lifetime of approximately several tens of nanoseconds due to the f-d transition is exhibited, and, when $Tb^{3+}$, $Pr^{3+}$, or $Eu^{3+}$ is added, light emission with a slow response of several microseconds to several milliseconds due to the f-f transition is exhibited. Further, a material other than the above-mentioned materials may be added to the first and second crystal phases. For example, an above-mentioned composition may contain yttrium (Y). Further, the first crystal phase may be formed of a rare earth element (Y, La, Ce, Pr, Nd, Pm, Sm, Eu, Tb, Dy, Ho, Er, Tm, or Yb) other than Gd and Lu insofar as the first crystal phase is formed of a perovskite type oxide material. Similarly, the second crystal phase may be formed of a rare earth element other than Gd and Lu insofar as the second crystal phase is formed of a garnet type oxide material.

In selecting the above-mentioned materials, what is important in the present embodiment is the composition of materials of the first crystal phase and the second crystal phase. Preferred compositional ratios (mol %) in the following four kinds of combinations of materials constituting the scintillator according to the present embodiment are shown in Table 1.

TABLE 1

| First Crystal Phase:Second Crystal Phase | Compositional Ratio [mol %] |
|---|---|
| $GdScO_3$:$Gd_3Sc_2Al_3O_{12}$ | 60:40 |
| $LuScO_3$:$Lu_3Sc_2Al_3O_{12}$ | 60:40 |
| $GdAlO_3$:$Al_2O_3$ | 48:52 |
| $LuAlO_3$:$Al_2O_3$ | 36:64 |

In order to obtain a scintillator having a satisfactory phase separation structure such as illustrated in the schematic view of FIG. 1 using the four kinds of combinations shown in Table 1, it is preferred that the scintillator is manufactured approximately with the compositions shown in Table 1. These compositional ratios correspond to eutectic compositions. However, it does not mean that any deviation of the above compositional ratios from the eutectic compositions is unacceptable, a range of ±5 mol % with respect to the eutectic compositions of these compositional ratios can be treated as a permissible range.

The reason why the above-mentioned permissible range of the compositions is determined is that, in forming the phase separation structure of the scintillator, the above-mentioned materials are in an eutectic relationship with each other, and that, by carrying out unidirectional solidification of the above-mentioned materials around the eutectic compositions, a crystal having the good-quality phase separation structure such as illustrated in FIG. 1 can be obtained. When the above-mentioned compositional ratio is out of the above-mentioned permissible range, that is, out of the range of (eutectic composition) ±5 mol %, one crystal phase deposits first, which is a cause of disturbing the satisfactory phase separation structure of the scintillator from the viewpoint of forming the phase separation structure. However, even when the above-mentioned compositional ratio is out of the range of (eutectic composition) ±5 mol %, there are cases in which, insofar as the compositional ratio is within a range of (eutectic composition) ±10 mol %, a scintillator having a partly satisfactory phase separation structure is obtained, and thus, the compositions are not limited to the above-mentioned range.

When $GdScO_3$, $LuScO_3$, $GdAlO_3$, $LuAlO_3$, or the like to which the emission center is added is used as a material of the first crystal phase as in the present embodiment, the material is excited when radiation is applied thereto to thereby emit light. In the present embodiment, it is preferred that the first crystal phase whose refractive index is higher than that of the second crystal phase and which includes a perovskite type oxide material emit light, but both of the first and the second crystal phases may emit light.

An optical waveguide property is an important characteristic of the scintillator having the phase separation structure including the first crystal phase which extends along one direction according to the present embodiment. In the present embodiment, the first crystal phase 11 is formed of a perovskite type oxide material, which has a refractive index that is relatively higher than that of a garnet type oxide material or alumina ($Al_2O_3$) constituting the second crystal phase 12. With regard to a material system constituting the first crystal phase 11 and the second crystal phase 12, the refractive indices and a refractive index ratio (refractive index of the second crystal phase/refractive index of the first crystal phase) are smaller than 1, respectively.

According to Snell's law, between materials having different refractive indices, when light enters a low refractive index medium from a high refractive index medium at a certain angle, the light is totally reflected. When the light enters at a lower angle, reflection and refraction are caused. Therefore, in the scintillator having the phase separation structure according to the present embodiment, the fact that there are generated refractive index ratios indicates a situation in which light is difficult to disperse due to the total reflection caused when light enters the lower refractive index medium from the higher refractive index medium. Specifically, light which propagates through the higher refractive index medium repeats refraction and reflection, and the higher refractive index medium confines more light therein and propagates more light therethrough compared with the lower refractive index medium. Therefore, it is desired that the refractive index ratio (i.e., refractive index of the lower refractive index crystal phase/refractive index of the higher refractive index crystal phase) is smaller than 1. Further, when only the total reflection conditions are taken into consideration, as the refractive index ratio becomes smaller, light is less liable to disperse. In the present embodiment, when the second crystal phase is a garnet type oxide material, compared with a case in which the second crystal phase is alumina ($Al_2O_3$), the refractive index ratio becomes smaller. In any of these cases, the refractive index of the first crystal phase including the columnar crystals is higher, and thus, light generated in the first crystal phase is totally reflected by an interface with the second crystal phase which is a matrix filling the side of the columnar crystals to propagate through the columnar crystals of the first crystal phase. However, the materials should be selected with regard to the respective applications while taking into consideration, for example, emission efficiency of the scintillator which emits light by excitation with radiation. Therefore, because the quality of the scintillator is not determined depending on only the refractive index ratio and the volume ratio, there is no doubt that all the material systems are important.

As described above, the scintillator having the phase separation structure according to the present embodiment is characterized by having the property of waveguiding light along the inside of the first crystal phase including the multiple columnar crystals having unidirectionality and of suppressing waveguiding of light such as scattering or reflection along a direction perpendicular to the unidirection. Therefore, crosstalk between light beams can be suppressed without providing banks in scintillators formed of a group of single crystals as in the conventional case.

(Manufacture of Scintillator)

A method of manufacturing the scintillator according to the present embodiment may be arbitrary insofar as the desired material systems with optimum composition are molten and solidified so as to have unidirectionality. In particular, as described below, the temperature gradient of a sample is required to be controlled so that the liquid-solid interface of the sample is flat along a surface perpendicular to a direction of movement of at least one of a heater and the sample, and it is preferred that the temperature gradient be about 30° C./mm or higher. However, in order to suppress or obviate generation of defects such as cracks in the crystals in a crystal phase due to thermal stress, the temperature gradient may be lowered to the extent that there is no harm in forming the phase separation structure of the scintillator according to the present embodiment. Further, it is also desirable to suppress and eliminate a defect such as cracks by reheating already formed crystals to the extent that the crystals are not molten. Further, as described above, the composition range which enables forming the eutectic structure of the phase separation structure of the scintillator according to the present embodiment is (eutectic composition) ±5 mol %. There is a correlation among this composition range, the temperature gradient, and the solidification rate to be described later, which is inherent in the material system. The scintillator according to the present embodiment should be manufactured in a so-called coupled eutectic zone.

For example, the scintillator may be manufactured by growing a crystal from a molten liquid as in the Czochralski process. Further, the scintillator may also be manufactured by the floating zone method. In the Bridgman technique, the solidification rate is required to be set so that the liquid-solid interface of the sample is as flat as possible along a surface perpendicular to the direction of movement of at least one of the heater and the sample, but, in the solidification, heat is exchanged between the sample and the outside mainly through the side of the sample. Therefore, the solidification rate depends on the diameter of the sample. More specifically, when the diameter of the sample is large, it takes time for the above-mentioned exchange of heat, and, in that case, when the solidification rate is not low, the liquid-solid interface is considerably curved, and the columnar crystals of the first crystal phase 11 are formed nonlinearly along unidirection in almost all the regions of the sample. This is because the direction of growth of the columnar crystals is substantially perpendicular to the liquid-solid interface. Further, when the solidification rate is further higher in relation to the size of the sample, not only the liquid-solid interface is not flat but also the liquid-solid interface cannot be kept smooth. As a result, microscopic roughness is caused along the direction of movement of at least one of the heater and the sample, which is accompanied with dendrites. It is also preferred to avoid such a problem. Accordingly, it is preferred that a sufficient temperature gradient of the liquid-solid interface is set, and at the same time, the solidification rate is 850 mm/h or lower.

Further, the diameter of the columnar crystals of the first crystal phase 11 of the scintillator and an average value of periods of distances between closest columnar crystals of the first crystal phase depend on the solidification rate. In particular, with regard to the period of the distance between the closest columnar crystals, the following correlation is found: $\lambda^2 \cdot v$ equals constant, where $\lambda$ is the period and v is the solidification rate. Therefore, when a desired period is set, the solidification rate is necessarily limited. However, as described above, considering the solidification rate which enables control of the liquid-solid interface so as to be flat and smooth as a limit of the manufacturing method, the average value of the periods $\lambda$ is within the range of 500 nm or more and 50 µm or less. The diameter of the columnar crystal of the first crystal phase is within the range of 50 nm or more and 30 µm or less accordingly. In this case, the range of the diameter of the columnar crystal also applies to a case where the section of the columnar crystal is not circular. When, for example, the section has an indeterminate shape, the smallest diameter is within the above-mentioned range. Further, it is preferred that the average ratio calculated from ratios of the largest diameter to the smallest diameter of the multiple columnar crystals of the first crystal phase is 10 or less. When the average ratio is more than 10, a lamella structure is appropriate. However, even when the ratios of some of the multiple columnar crystals of the first crystal phase are larger than 10, if the average ratio of all the columnar crystals is 10 or less, such columnar crystals are acceptable. Further, in terms of the manufacturing conditions, the lamella structure is more liable to be formed as the compositional ratio of the material systems of the two phases on a molar basis is nearer to 1:1, and thus, it is preferred that the manufacturing conditions and an additive are selected so that a lamella structure is not formed.

Next, the feed composition of the raw materials of the sample is described. The composition ratios of the above-mentioned scintillator are shown in Table 1. The feed composition may be out of the range of (eutectic composition) ±5 mol %. More specifically, through unidirectional solidification from a state in which the entire sample is molten, the material which deviates from the eutectic composition is deposited first in an early stage of growing, and as a result, the remaining molten liquid has the eutectic composition. Therefore, it is also preferred to grow the material which deviates from the eutectic composition in an early stage of growing, and then, grow the crystal again after the molten liquid has the eutectic composition. After the scintillator is manufactured, an unnecessary portion may be cut off.

(Application of Scintillator)

The scintillator having the phase separation structure according to the present embodiment in combination with a photodetector may be used as a radiation detector for medical care, for industrial use, for high-energy physics, and for space. In particular, the scintillator according to the present embodiment has the optical waveguide function without providing banks, and thus, it is preferred to use the scintillator in a situation in which waveguiding of light is required in a specific direction toward the photodetector. Further, the scintillator is also effective in being used in an X-ray CT scanner where formation of banks is necessary or being used as a substitute for a CsI needle crystal in an X-ray flat panel detector (FPD). In this case, by adding another material or adding an emission center material to a light emitting phase, it is also possible to adjust the emission wavelength of the scintillator so as to conform to the light receiving sensitivity characteristics of the photodetector.

The scintillator is disposed so that the first crystal phase having unidirectionality faces the photodetector in a state in which the thickness direction of the columnar crystal is perpendicular to a surface of the photodetector. Further, it is also preferred to join or dispose the scintillator through the intermediation of a protective layer or a film or layer having an antireflective function or the like, which is disposed between the photodetector and the scintillator according to the present embodiment.

EXAMPLE 1

The present example relates to manufacture of the scintillator having the phase separation structure. In particular, the present example is an example in which a perovskite type oxide material of $GdScO_3$ was used as the first crystal phase and a garnet type oxide material of $Gd_3Sc_2Al_3O_{12}$ was used as the second crystal phase.

First, 0.1 mol % of Ce with respect to the total amount of substance of the first crystal phase and the second crystal phase was added to a powder mixture weighted so that the compositional ratio between $GdScO_3$ and $Gd_3Sc_2Al_3O_{12}$ was 60:40 (mol %) as shown in Table 1, and sufficient mixing of a sample was carried out. The prepared powder was put in an Ir crucible. The crucible was heated by induction heating to 1,700° C. After the sample was entirely molten, the state was held for 30 minutes. Then, the sample was grown at a rate of 12 mm/h. The scintillator crystal manufactured in this way was cut at a thickness of 1 mm, and the structure of a surface thereof perpendicular to the direction of solidification was observed with an optical microscope and a scanning electron microscope (SEM).

Figure 2A:
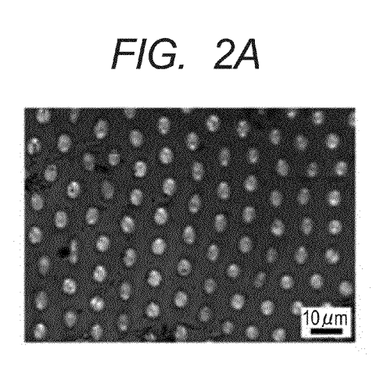
FIGS. 2A and 2B are images observed with an optical microscope of sections of scintillators according to the present invention.

FIG. 2A shows a transmission image of a surface perpendicular to the direction of solidification with an optical microscope. The surface had a phase separation structure as shown in the optical microscope image. According to composition analysis by the SEM, the phase having a cylindrical structure was $GdScO_3$ whose refractive index was higher, and the phase to be the matrix was $Gd_3Sc_2Al_3O_{12}$ whose refractive index was lower. When the transmission image was taken by the optical microscope, light was waveguided through the $GdScO_3$ phase whose refractive index was higher, and the anisotropy of light propagation could be confirmed.

Figure 3A:
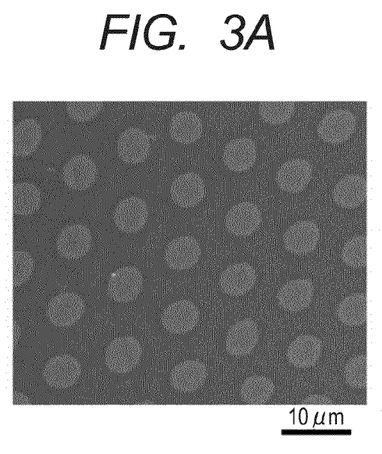
FIGS. 3A, 3B, 3C and 3D are images observed with a scanning electron microscope of scintillators according to the present invention.
Figure 3B:
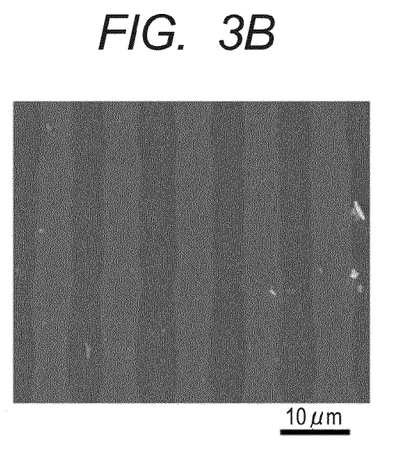
Figure 3C:
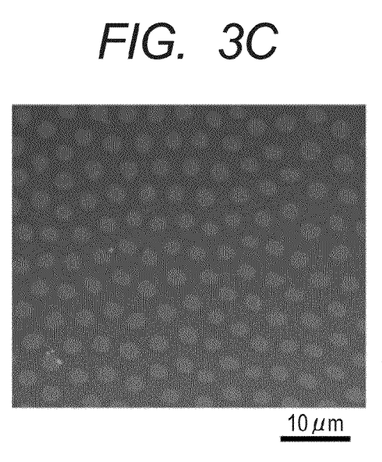
Figure 3D:
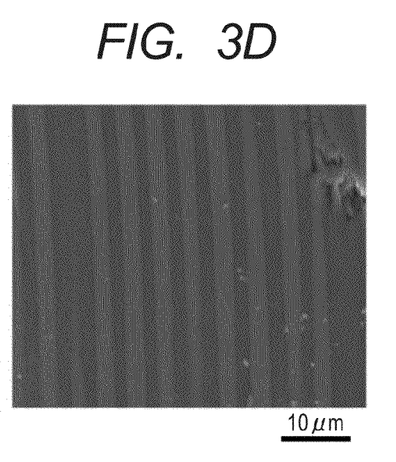

FIGS. 3A to 3D show the result of observation of the structures with different growth rates with the SEM. FIGS. 3A and 3B are images of a section perpendicular to the growth direction and of a section parallel to the growth direction, respectively, when the growth rate was 3 mm/h. FIGS. 3C and 3D are images of a section perpendicular to the growth direction and of a section parallel to the growth direction, respectively, when the growth rate was 12 mm/h. since there is a relationship of $\lambda \propto v^{-1/2}$, where $\lambda$ is the period of the structure and v is the growth rate, and thus, when the growth rate becomes four times as high, the period of the structure becomes approximately ½. When the growth rate was 3 mm/h, the diameter of the cylinders was 5.0 µm and the pitches were 9.5 µm. When the growth rate was 12 mm/h, the diameter of the cylinders was 2.5 µm and the pitches were 4.5 µm.

Figure 4A:
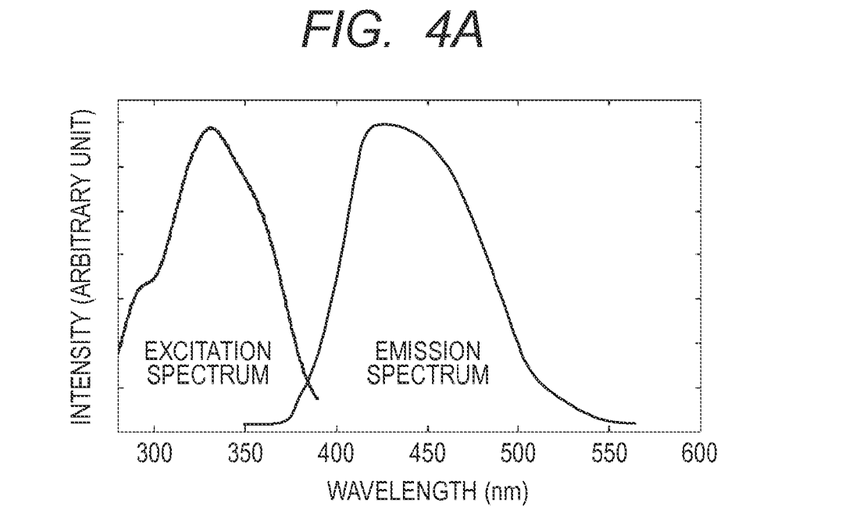
FIGS. 4A and 4B are graphs showing excitation spectra and emission spectra of scintillators according to the present invention.
Figure 4B:
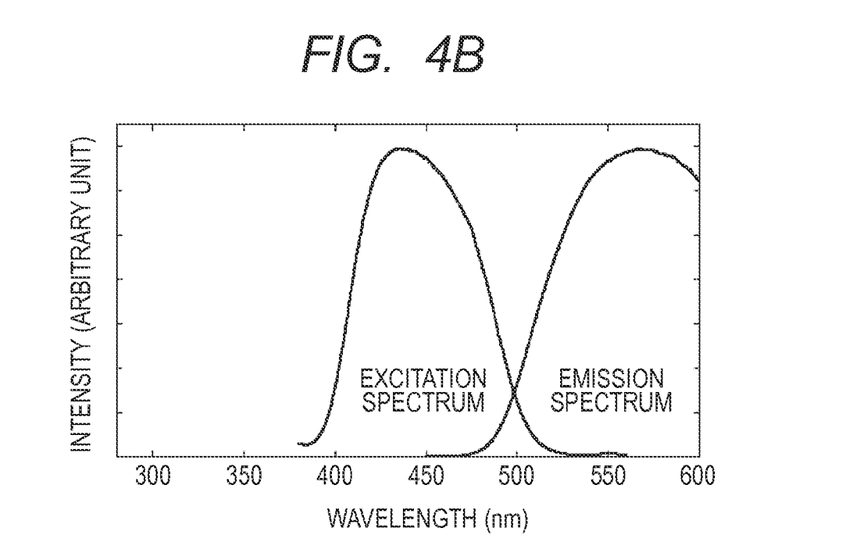

FIGS. 4A and 4B show the relationship between excitation spectra and emission spectra in the respective phases. FIG. 4A shows an excitation spectrum and an emission spectrum of the first crystal phase ($GdScO_3:Ce^{3+}$) forming the cylinders. FIG. 4B shows an excitation spectrum and an emission spectrum of the second crystal phase ($Gd_3Sc_2Al_3O_{12}:Ce^{3+}$) forming the matrix. Blue light emission by the first crystal phase forming the cylinders overlaps the excitation band of the second crystal phase forming the matrix, and emitted light which leaks to the matrix side without being totally reflected within the cylinders is absorbed and converted into yellow light emission. In other words, among light generated in the first crystal phase by radiation excitation, light emitted so as to satisfy the total reflection critical angle is waveguided through the cylinders. On the other hand, light which leaks to the matrix side without being totally reflected within the cylinders is absorbed by the second crystal phase, converted into yellow light emission, and becomes light which spreads in the crystals while being refracted, and does not go back to the propagation mode any longer. Similar light emission was exhibited in the case of X-ray excitation, and it could be confirmed that the manufactures functioned as a scintillator.

As described above, with regard to a combination of materials as in the present example, blue light emission which propagates through the first crystal phase forming the cylinders and yellow light emission which simply spreads in the crystals exist. This means that, when only the blue light emission component is separated and imaging is carried out, information of only light which propagates through the cylinders and drops immediately below the cylinders is used, and thus, an image excellent in resolution may be acquired. However, light emission in the matrix and light which leaks from the cylinders do not contribute to the image as signals, and thus, the luminance as a whole becomes lower.

As described above, it was confirmed that the structure having the phase separation structure manufactured in the present example in which a perovskite type oxide material of $GdScO_3$ was used as the first crystal phase and a garnet type oxide material of $Gd_3Sc_2Al_3O_{12}$ was used as the second crystal phase worked as a phase separation scintillator.

EXAMPLE 2

The present example relates to manufacture of the scintillator having the phase separation structure. In particular, the present example is an example in which a perovskite type oxide material of $GdAlO_3$ as the first crystal phase and alumina ($Al_2O_3$) was used as the second crystal phase.

First, 0.1 mol % of $Ce^{3+}$ with respect to the total amount of substance of the first crystal phase and the second crystal phase was added to a powder mixture weighted so that the compositional ratio between $GdAlO_3$ and $Al_2O_3$ was 48:52 (mol %) as shown in Table 1, and sufficient mixing of a sample was carried out. The prepared powder was put in an Ir crucible. The crucible was heated by induction heating to 1,700° C. After the sample was entirely molten, the state was held for 30 minutes. Then, the sample was grown at a rate of 54 mm/h. The scintillator crystal manufactured in this way was cut at a thickness of 1 mm, and the structure of a surface thereof perpendicular to the direction of solidification was observed with an optical microscope and a SEM.

Figure 2B:
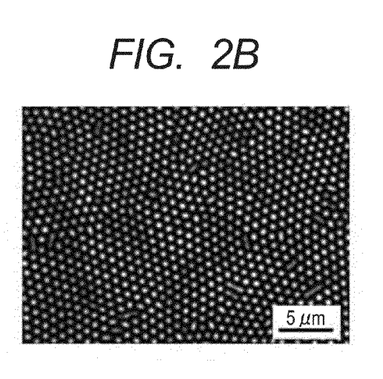
Figure 8A:
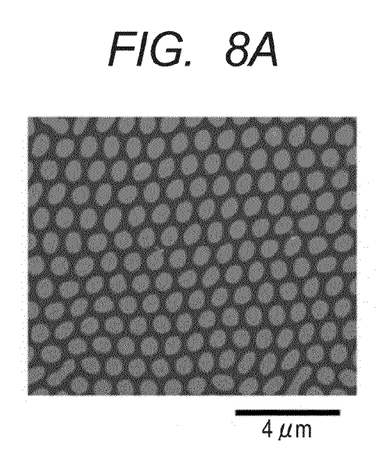
FIGS. 8A and 8B are images observed with a scanning electron microscope of scintillators according to the present invention.
Figure 8B:
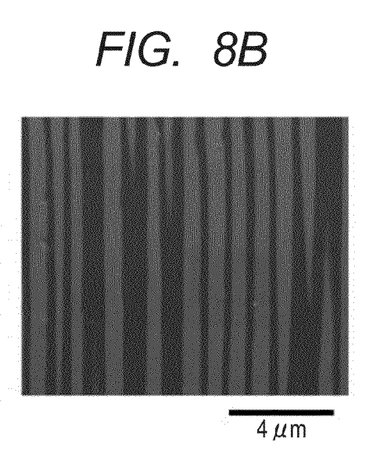

FIGS. 8A and 8B show the result of observation of the structure with the SEM. FIGS. 8A and 8B are SEM images of a section perpendicular to a growth direction and of a section parallel to the growth direction, respectively. According to composition analysis by the SEM, the phase having a cylindrical structure was $GdAlO_3$ and the phase to be the matrix was $Al_2O_3$. The period of the $GdAlO_3$ cylindrical structure on average was about 900 nm, and the diameter of the $GdAlO_3$ cylindrical structure on average was about 650 nm. In this way, in the structure, the $GdAlO_3$ cylinders (n=2.05) whose refractive index was higher were embedded in the $Al_2O_3$ (n=1.75) matrix whose refractive index was lower. FIG. 2B shows a transmission image of a surface perpendicular to the direction of solidification by an optical microscope. Light was waveguided through the $GdAlO_3$ phase whose refractive index was higher, and thus, the $GdAlO_3$ side was observed as bright spots, and anisotropic light propagation could be confirmed.

Figure 5A:
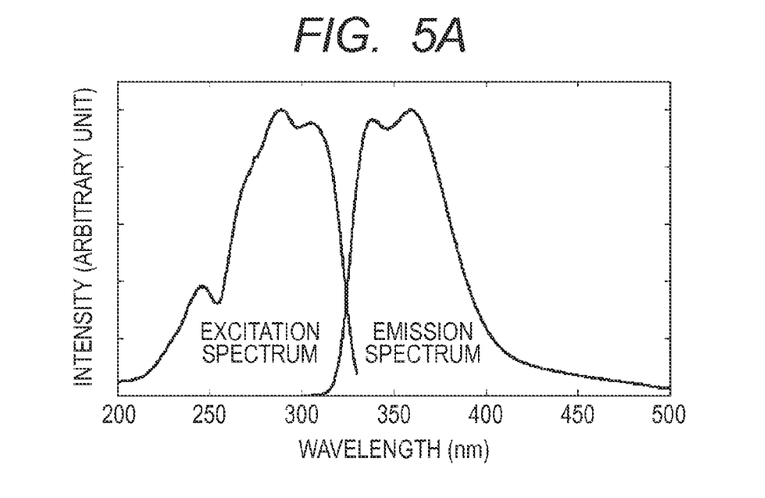
FIGS. 5A and 5B are graphs showing excitation spectra and emission spectra of scintillators according to the present invention.

FIG. 5A shows an emission spectrum and an excitation spectrum. Blue light emission was exhibited through the first crystal phase ($GdAlO_3:Ce^{3+}$) forming the cylinders. $Al_2O_3$ as the second crystal phase did not emit light. Among light generated in the first crystal phase, light emitted so as to satisfy the total reflection critical angle was waveguided through the cylinders. On the other hand, light which leaked to the matrix side without being totally reflected within the cylinders became light which spreaded in the crystals while being refracted. Similar light emission was exhibited in the case of X-ray excitation, and it was confirmed that the manufactures could function as a scintillator.

Figure 5B:
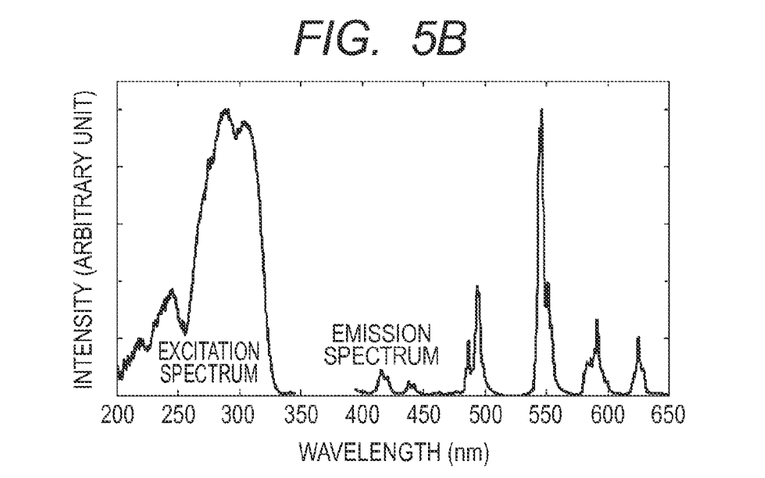

Even when the above-mentioned scintillator uses as an emission center $Tb^{3+}$, $Pr^{3+}$, or $Eu^{3+}$ in place of $Ce^{3+}$, the scintillator also function as a scintillator. In this case, light is emitted due to the forbidden f-f transition using $Tb^{3+}$, $Pr^{3+}$, or $Eu^{3+}$, and thus, the emission lifetime becomes longer. However, by causing the light emission to be green light emission, the light emission may be caused to conform to the sensitivity of a photodetector using a CCD or a-Si to be light emission suitable for imaging. FIG. 5B shows an emission spectrum and an excitation spectrum of a sample manufactured by a similar method under a state in which the emission center was $Tb^{3+}$. Light emission due to the f-f transition from $Tb^{3+}$ which had a sharp peak in a green region was exhibited. Similar light emission was exhibited in the case of X-ray excitation, and it was confirmed that the manufactures could function as a scintillator.

Figure 9:
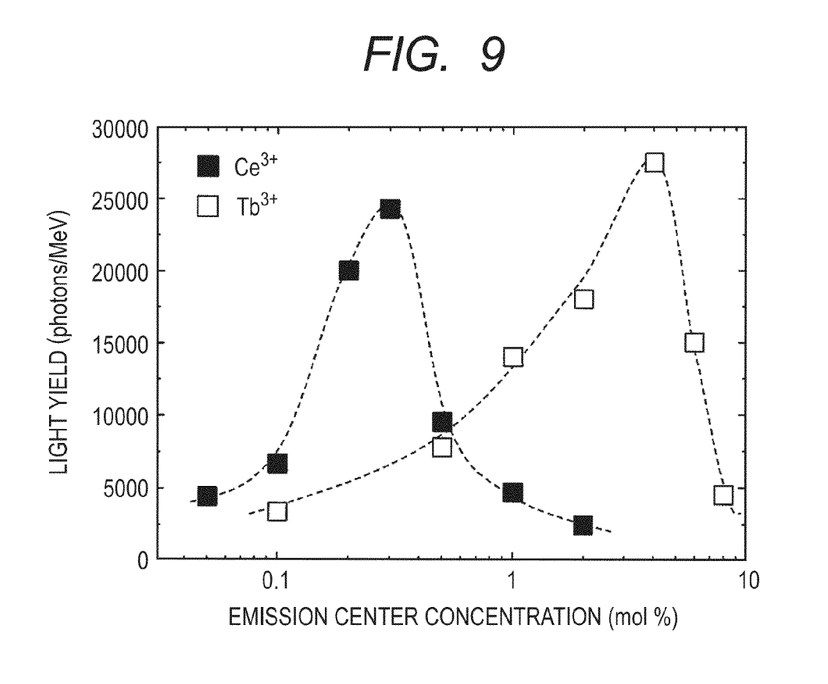
FIG. 9 is a graph showing the relationship between emission center concentration and the amount of emitted light of scintillators according to the present invention.

In this case, samples were manufactured by adding 0.05 mol % of $Ce^{3+}$, 0.1 mol % of $Ce^{3+}$, 0.2 mol % of $Ce^{3+}$, 0.3 mol % of $Ce^{3+}$, 0.5 mol % of $Ce^{3+}$, 1.0 mol % of $Ce^{3+}$, and 2.0 mol % of $Ce^{3+}$ and by adding 0.1 mol % of $Tb^{3+}$, 0.5 mol % of $Tb^{3+}$, 1.0 mol % of $Tb^{3+}$, 2.0 mol % of $Tb^{3+}$, 4.0 mol % of $Tb^{3+}$, 6.0 mol % of $Tb^{3+}$, and 8.0 mol % of $Tb^{3+}$, respectively, with respect to the total amount of substance of the first crystal phase and the second crystal phase. FIG. 9 is a graph showing values of emission center concentration and light yield when $Ce^{3+}$ and $Tb^{3+}$ were used as an emission center. Light yield is a value which is an absolute value of the amount of light emission expressed by the number of photons of light generated when 1 photon of radiation of 1 MeV enters the scintillator (photons/MeV). In this case, emission center concentration is a value with respect to the total amount of substance of $GdAlO_3$ and $Al_2O_3$. The concentration at which the amount of light emission is at the maximum differs between $Ce^{3+}$ and $Tb^{3+}$. In the case of $Ce^{3+}$, the amount of light emission was at the maximum when the concentration was 0.3 mol %, while, in the case of $Tb^{3+}$, the amount of light emission was at the maximum when the concentration was 4.0 mol %. Assume that, when the value of the light yield is approximately 4,000 (photons/MeV) or more, the amount of light emission is significant for the scintillator to function as a scintillator. It was found that the scintillator worked as an effective scintillator when the light yield was in the range of 0.05 to 1.0 mol % when $Ce^{3+}$ was used as an emission center, and when the light yield was in the range of 0.1 to 8.0 mol % when $Tb^{3+}$ was used as an emission center.

As described above, it was confirmed that the structure having the phase separation structure manufactured in the present example in which a perovskite type oxide material of $GdAlO_3$ was used as the first crystal phase and alumina ($Al_2O_3$) was used as the second crystal phase worked as a phase separation scintillator.

EXAMPLE 3

This example relates to a radiation detector using the scintillator manufactured in Example 1 and Example 2.

Figure 6:
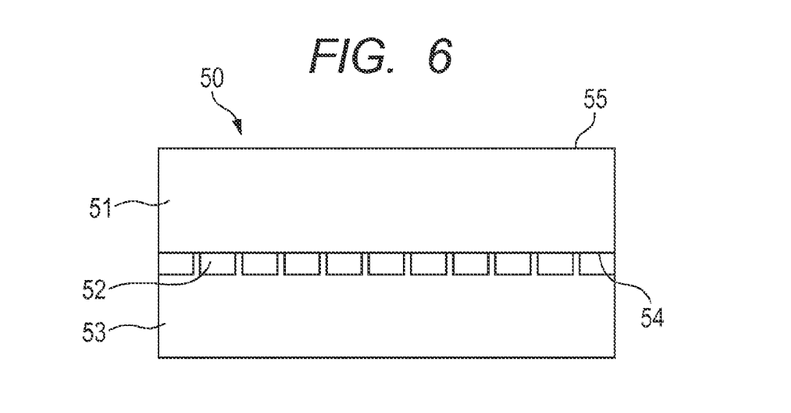
FIG. 6 is a schematic sectional view of a radiation detector according to the present invention.

FIG. 6 is a schematic sectional view of the radiation detector according to the present example. The scintillators manufactured in Example 1 and Example 2, respectively, were cut at a thickness of 1 mm. Each of such scintillators 51 was disposed on photodetectors 52 which were arranged in an array on a substrate 53 so that the columnar crystals face the photodetectors 52 approximately in a perpendicular direction to form a radiation detector 50. The scintillator 51 had a first principal surface 54 and a second principal surface 55 which were not located on a same surface. A second crystal phase 12 of the scintillator 51 had a portion which was exposed on the first principal surface 54 and a portion which was exposed on the second principal surface 55, and these exposed portions were connected to each other. That is, the scintillator 51 was disposed in a state in which the first principal surface 54 thereof faced the photodetectors 52. It was confirmed from output of the photodetector array that, when X-rays were applied to the scintillator disposed in the radiation detector, dispersion of light was suppressed compared with a case of a scintillator formed of a single-crystal without banks. In this case, the X-rays were applied parallel to the direction of solidification of the crystals. Further, it was confirmed that, even when a resin as a protective layer was provided between the scintillator having the phase separation structure and the photodetector array and the elements were joined to each other, a state in which dispersion of light was suppressed was held. It could be shown that, as a result, even when a layer or a film of another material was interposed between the scintillator manufactured in any of Example 1 and Example 2 and the photodetector array, a radiation detector could be constituted.

Figure 7A:
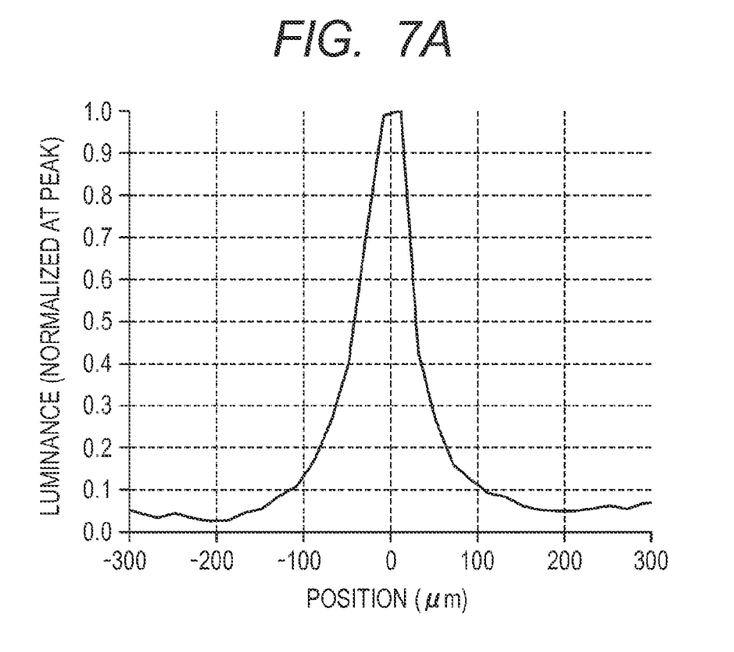
FIGS. 7A and 7B are graphs each showing optical waveguide characteristics of a scintillator according to the present invention.
Figure 7B:
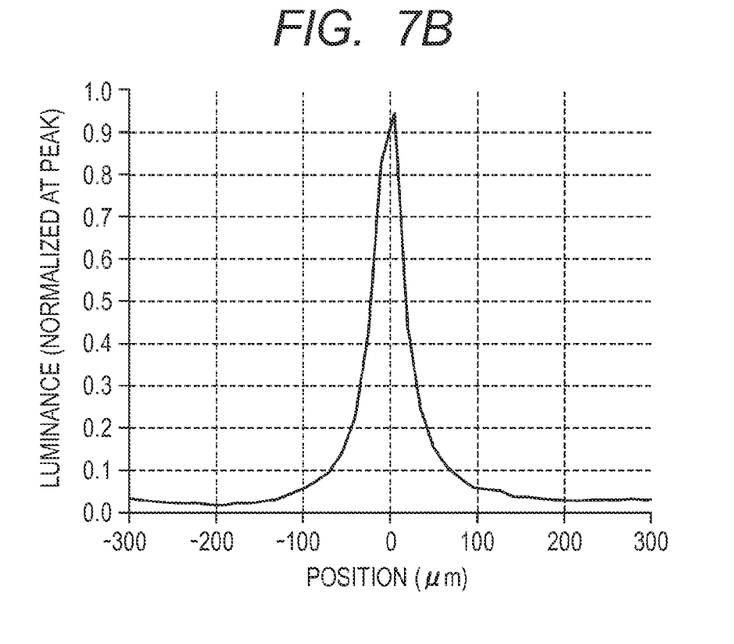

In this case, with regard to the optical waveguide property of the scintillators manufactured in Example 1 and Example 2, propagating characteristics of emitted light were evaluated. As the samples, $GdScO_3$—$Gd_3Sc_2Al_3O_{12}$:$Ce^{3+}$ and $GdAlO_3$—$Al_2O_3$:$Tb^{3+}$ each polished to have a thickness of 1 mm were disposed as described above and were used. As the source of X-rays, a tungsten light bulb was used, and X-rays obtained under the conditions of 60 kV, 1 mA, and without an Al filter were applied to these samples to be evaluated through an opening of ϕ50 μm in a tungsten plate having a thickness of 2 mm, and the light intensity distribution at the bottom surface of the samples to be evaluated was measured. The X-rays were applied parallel to the direction of solidification of the crystals. The measurement was made using CCDs with 20-μm pitches. Each of FIGS. 7A and 7B shows an intensity profile of a section passing through a peak value of the light intensity distribution. FIG. 7A shows a profile of $GdScO_3$—$Gd_3Sc_2Al_3O_{12}$:$Ce^{3+}$ and FIG. 7B shows a profile of $GdAlO_3$—$Al_2O_3$:$Tb^{3+}$. In each of the cases, the peak luminance was normalized and its half-width was calculated. While the half-width of $GdScO_3$—$Gd_3Sc_2Al_3O_{12}$:$Ce^{3+}$ was 60 μm, the half-width of $GdAlO_3$—$Al_2O_3$:$Tb^{3+}$ was 40 μm. It was confirmed that, with regard to each of the samples, the phase whose refractive index is higher and which emits light forms cylinders, waveguided light propagates only through the cylinders, and thus, the extent of leakage was small and a high spatial resolution was exhibited. This indicates that light generated when X-rays entered was effectively waveguided to the light receiving surface. Compared with the case of $GdScO_3$—$Gd_3Sc_2Al_3O_{12}$:$Ce^{3+}$, $GdAlO_3$—$Al_2O_3$:$Tb^{3+}$ formed an optical interface having a larger difference in refractive index, and further, the scale of the cylindrical structure for waveguiding light was small and the cylindrical structure existed with high density, and thus, a high spatial resolution was exhibited.

From the above, it was confirmed that the scintillators having the phase separation structure manufactured in Example 1 and Example 2 each had an optical waveguide function and was useful for the radiation detector according to the present example.

Industrial Applicability

The scintillator having the phase separation structure according to the present invention emits light by excitation with radiation, and has a waveguide property of the emitted light, and thus, is useful as a radiation detector when used in combination with a photodetector without forming conventional banks. In particular, the scintillator can be used in a measurement apparatus for medical care, for industrial use, for high-energy physics, and for space using radiation such as X-rays.

REFERENCE SIGNS LIST 11 first crystal phase
12 second crystal phase
13 diameter of columnar crystal constituting first crystal phase
14 distance between closest columnar crystals constituting first crystal phase
15 thickness of scintillator
16 thickness direction of columnar crystal
50 radiation detector
51 scintillator
52 photodetector
53 substrate
54 first principal surface
55 second principal surface While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-164320, filed Jul. 27, 2011, which is hereby incorporated by reference herein in its entirety.

The invention claimed is:

1. A scintillator, comprising:
a first crystal phase including multiple columnar crystals; and
a second crystal phase covering a side of each of the multiple columnar crystals,
wherein the scintillator has a first surface and a second surface, which are not located on the same plane,
wherein the first surface and the second surface each have a portion to which the second crystal phase is exposed,
wherein the first crystal phase comprises a perovskite type oxide material including at least one element selected from the group consisting of Lu and Gd, and a rare earth element as an emission center,
wherein the first crystal phase emits light by radiation excitation, and
wherein the second crystal phase comprises alumina or a garnet type oxide material including A and B, where A is at least one element selected from the group consisting of Lu and Gd, and B is at least one element selected from the group consisting of Al, Sc, and Y.

2. The scintillator according to claim 1, wherein the first crystal phase has a higher refractive index than a refractive index of the second crystal phase.

3. The scintillator according to claim 1, which contains 0.001 mol % or more of a rare earth element comprising at least one of $Ce^{3+}$, $Tb^{3+}$, $Pr^{3+}$, and $Eu^{3+}$ with respect to a total amount of substance of the first crystal phase and the second crystal phase.

4. The scintillator according to claim 1, which contains 0.001 mol % or more of a rare earth element including at least one of $Ce^{3+}$ and $Tb^{3+}$ with respect to a total amount of substance of the first crystal phase and the second crystal phase, wherein the first crystal phase comprises Gd, Al, and O, and the second crystal phase comprises alumina.

5. The scintillator according to claim 4, wherein a concentration of $Ce^{3+}$ as the rare earth element is 0.05 to 1.0 mol % with respect to the total amount of substance of the first crystal phase and the second crystal phase.

6. The scintillator according to claim 4, wherein a concentration of $Tb^{3+}$ as the rare earth element is 0.1 to 8.0 mol % with respect to the total amount of substance of the first crystal phase and the second crystal phase.

7. The scintillator according to claim 4, wherein the first crystal phase comprises $GdAlO_3$.

8. The scintillator according to claim 1, wherein an average value of diameters of the multiple columnar crystals is from 300 nm to 30 μm.

9. The scintillator according to claim 1, wherein a material constituting the first crystal phase and a material constituting the second crystal phase form a eutectic structure of a phase separation structure.

10. The scintillator according to claim 9, wherein a compositional ratio between the first crystal phase and the second crystal phase is within a range of ±5 mol % of a eutectic compositional ratio.

11. The scintillator according to claim 1, wherein the second crystal phase comprises a garnet type oxide material represented by $A_3B_5O_{12}$.

12. The scintillator according to claim 1, wherein a portion of the second crystal phase exposed to the first surface and a portion of the second crystal phase exposed to the second surface are connected to each other.

13. The scintillator according to claim 1, wherein the first surface and the second surface each have a portion to which the first crystal phase is exposed, and
wherein a portion of the first crystal phase exposed to the first surface and a portion of the first crystal phase exposed to the second surface are connected to each other.

14. The scintillator according to claim 1, wherein a material forming the first crystal phase and a material forming the second crystal phase are capable of forming together a phase separation structure during solidification.

15. The scintillator according to claim 1, wherein the multiple columnar crystals are located in the second crystal phase.

16. A radiation detector, comprising:
a photodetector; and
the scintillator according to claim 1 disposed so that the first surface faces the photodetector.

17. The radiation detector according to claim 16, further comprising a layer disposed between the photodetector and the scintillator.

18. A scintillator, comprising:
a first crystal phase including multiple columnar crystals; and
a second crystal phase covering a side of each of the multiple columnar crystals,
wherein the scintillator has a first surface and a second surface, which are not located on the same plane,
wherein each of the first surface and the second surface has a portion to which the second crystal phase is exposed,
wherein the first crystal phase comprises a perovskite type oxide material including at least one element selected from the group consisting of Lu and Gd, and a rare earth element as an emission center,
wherein the first crystal phase emits light by radiation excitation, and wherein a material constituting the first crystal phase and a material constituting the second crystal phase are capable of forming together a phase separation structure during solidification.

19. The scintillator according to claim 18, wherein the material constituting the first crystal phase and the material constituting the second crystal phase form a eutectic structure of a phase separation structure.

20. A scintillator, comprising:
a first crystal phase including multiple columnar crystals; and
a second crystal phase covering a side of each of the multiple columnar crystals,
wherein the first crystal phase comprises a perovskite type oxide material including at least one element selected from the group consisting of Lu and Gd, and an emission center,
wherein the first crystal phase emits light by radiation excitation,
wherein the second crystal phase comprises a garnet type oxide material represented by $A_3B_5O_{12}$, including A and B, where A is at least one element selected from the group consisting of Lu and Gd, and B is at least one element selected from the group consisting of Al, Sc, and Y, and
wherein 0.001 mol% or more of a rare earth element comprising at least one of $Ce^{3+}$, $Tb^{3+}$, $Pr^{3+}$, and $Eu^{3+}$ with respect to a total amount of a substance of the first crystal phase and the second crystal phase is contained as the emission center.

* * * * *